(12) United States Patent
Kappel et al.

(10) Patent No.: US 6,532,131 B1
(45) Date of Patent: Mar. 11, 2003

(54) IMPORT/EXPORT ELEMENT WITH SELECTOR NUT AND BEVEL GEAR FOR ROTATION

(75) Inventors: Glendon D. Kappel, Eagan, MN (US); Warren D. Pannkuk, Lakeville, MN (US)

(73) Assignee: Plasmon IDE, Inc., Colorado Springs, CO (US)

( * ) Notice: Subject to any disclaimer, the term of this patent is extended or adjusted under 35 U.S.C. 154(b) by 44 days.

(21) Appl. No.: 09/589,481

(22) Filed: Jun. 7, 2000

(51) Int. Cl.[7] ............................................. G11B 15/18

(52) U.S. Cl. ........................................ 360/92; 369/178

(58) Field of Search ................................ 369/176, 178, 369/179, 177, 178.01, 30.48, 30.49, 30.7; 360/92, 93

(56) References Cited

U.S. PATENT DOCUMENTS

| | | | |
|---|---|---|---|
| 4,271,440 A | 6/1981 | Jenkins | |
| 4,504,936 A | 3/1985 | Faber | |
| 4,607,354 A | 8/1986 | Ishibashi | |
| 4,608,679 A | 8/1986 | Rudy | |

(List continued on next page.)

FOREIGN PATENT DOCUMENTS

| | | |
|---|---|---|
| DE | 10048213 A1 | 9/1999 |
| EP | 0 280 263 | 8/1988 |
| EP | 0389160 | 9/1990 |
| EP | 0935246 | 8/1999 |
| JP | 59-30263 | 2/1984 |
| JP | 59-36003 | 2/1984 |
| JP | 59-231763 | 12/1984 |
| JP | 61-240474 | 10/1986 |
| JP | 1-50275 | 2/1989 |
| JP | 408263906 A | 10/1996 |
| JP | 09022561 | 1/1997 |

*Primary Examiner*—Allen Cao
*Assistant Examiner*—Dzung C. Nguyen
(74) *Attorney, Agent, or Firm*—Gerald E. Helget; Nelson R. Capes; Briggs and Morgan (57) ABSTRACT

In a data media storage library for storing and accessing storage media, the storage media being contained in cartridges, the data media storage library having a library housing, an access opening in the library housing for inserting cartridges, a storage array within the library housing including a number of storage locations, a plurality of media storage elements adapted to hold the storage media, a plurality of data transfer elements adapted to read and write information on the storage media, and a media transport element within the library housing adapted to move the storage media between the media storage element and the data transfer element, an import/export element which rotates the cartridge 180 degrees after moving the cartridge from the access opening to the media transport element, including: a cartridge holder adapted to receive the media cartridge from the access opening; a lead screw mounted in a first direction between the access opening and the media transport element and rotating about a first axis parallel to the first direction and a cartridge holder carrier engaging the lead screw and connected to the cartridge holder for translation of the cartridge holder along the first axis; a keyed nut threaded on the lead screw, the keyed nut having a first slot and a second slot, an intermediate point between the access opening and the media transport element, a first rail extending between the access opening and the intermediate point, and a second rail extending between the intermediate point and the media transport element; one of the first slot and said second slot engaging the first rail between the access opening and the intermediate point and engaging the second rail between the intermediate point and the media transport element; a horizontal gap between the first rail and the second rail at the intermediate point; a first bevel gear fastened to the keyed nut; and a second bevel gear meshing with the first bevel gear and a shaft driven by the second bevel gear and connected to the cartridge holder.

27 Claims, 6 Drawing Sheets

U.S. PATENT DOCUMENTS

| | | |
|---|---|---|
| 4,614,474 A | 9/1986 | Sudo |
| 4,654,727 A | 3/1987 | Blum |
| 4,675,856 A | 6/1987 | Rudy |
| 4,730,735 A | 3/1988 | Lechner |
| 4,742,504 A | 5/1988 | Takasuka |
| 4,779,151 A | 10/1988 | Lind |
| 4,787,074 A | 11/1988 | Deck |
| 4,815,055 A | 3/1989 | Fago, Jr. |
| 4,815,056 A | 3/1989 | Toi |
| 4,817,070 A | 3/1989 | Hug |
| 4,817,071 A | 3/1989 | Carlson |
| 4,839,758 A | 6/1989 | Honjoh |
| 4,846,619 A | 7/1989 | Crabtree |
| 4,850,485 A | 7/1989 | Ishikawa |
| 4,853,916 A | 8/1989 | Tomita |
| 4,878,137 A | 10/1989 | Yamashita |
| 4,912,581 A | 3/1990 | Watanabe |
| 4,928,245 A | 5/1990 | Moy et al. |
| 4,972,277 A | 11/1990 | Sills et al. |
| 4,998,232 A | 3/1991 | Methlie |
| 5,001,582 A | 3/1991 | Numasaki |
| 5,010,536 A | 4/1991 | Wanger |
| 5,014,255 A | 5/1991 | Wanger |
| 5,033,038 A | 7/1991 | Kobayashi |
| 5,036,503 A | 7/1991 | Tomita |
| 5,040,159 A | 8/1991 | Oliver |
| 5,043,692 A * | 8/1991 | Sites et al. .................. 338/28 |
| 5,043,962 A | 8/1991 | Wanger |
| 5,056,073 A | 10/1991 | Fitzgerald |
| 5,060,211 A | 10/1991 | Blanding |
| 5,062,093 A | 10/1991 | Christi |
| 5,065,379 A | 11/1991 | Smith |
| 5,101,387 A | 3/1992 | Wanger |
| 5,123,000 A | 6/1992 | Fitzgerald |
| 5,150,341 A | 9/1992 | Shibayama |
| 5,153,862 A | 10/1992 | Taylor |
| 5,206,845 A | 4/1993 | Baxter |
| 5,220,548 A | 6/1993 | Nakatsukasa |
| 5,228,016 A | 7/1993 | Menke |
| 5,231,552 A | 7/1993 | Schneider |
| 5,255,251 A | 10/1993 | Fitzgerald |
| 5,274,619 A * | 12/1993 | Suzuki .................. 369/77.1 |
| 5,345,350 A | 9/1994 | Ellis |
| 5,362,192 A | 11/1994 | Dang |
| 5,377,121 A | 12/1994 | Dimitri |
| 5,431,520 A | 7/1995 | Brugger |
| 5,471,561 A * | 11/1995 | Cowgill et al. ............... 395/82 |
| 5,487,579 A | 1/1996 | Woodruff |
| 5,502,697 A | 3/1996 | Taki |
| 5,517,473 A | 5/1996 | Permut |
| 5,532,888 A | 7/1996 | Acosta et al. |
| 5,546,366 A | 8/1996 | Dang |
| 5,602,821 A | 2/1997 | McPherson |
| 5,659,434 A | 8/1997 | Yamakawa et al. |
| 5,659,440 A | 8/1997 | Acosta et al. |
| 5,680,375 A | 10/1997 | Christie, Jr. |
| 5,680,377 A | 10/1997 | Dang et al. |
| 5,692,623 A | 12/1997 | Todor et al. |
| 5,764,615 A | 6/1998 | Ware |
| 5,781,367 A | 7/1998 | Searle et al. |
| 5,795,042 A | 8/1998 | Todor |
| 5,798,997 A | 8/1998 | Ware |
| 5,813,009 A | 9/1998 | Johnson |
| 5,894,469 A | 4/1999 | Usami et al. |
| 5,959,803 A | 9/1999 | Okamoto |
| 5,966,366 A | 10/1999 | Pollard |
| 5,975,450 A * | 11/1999 | Leger et al. ................. 242/337 |
| 5,995,459 A | 11/1999 | Kappel |
| 5,999,356 A * | 12/1999 | Dimitri et al. ................. 360/71 |
| 6,008,964 A | 12/1999 | Goodknight et al. |
| 6,019,230 A | 2/2000 | Hayashi |
| 6,027,296 A | 2/2000 | Meier |
| 6,064,544 A * | 5/2000 | Wada ......................... 360/92 |
| 6,082,554 A | 7/2000 | Ostwald |
| 6,094,322 A | 7/2000 | Nakagomi ................... 360/92 |
| 6,141,178 A * | 10/2000 | Nakajima et al. ............. 360/92 |
| 6,175,466 B1 * | 1/2001 | Hori et al. .................... 360/92 |
| 6,233,111 B1 * | 5/2001 | Schneider et al. ............ 360/92 |
| 6,244,677 B1 | 6/2001 | Millhiser |
| 6,266,316 B1 | 7/2001 | Luffel et al. |
| 6,301,218 B1 * | 10/2001 | Jones ....................... 369/178 |
| 6,330,217 B1 | 12/2001 | Paul et al. |
| 6,333,829 B1 | 12/2001 | Jones |

* cited by examiner

IMPORT/EXPORT ELEMENT WITH SELECTOR NUT AND BEVEL GEAR FOR ROTATION

BACKGROUND OF THE INVENTION

Storage media library systems (jukeboxes) are devices which contain multiple storage media drives and many pieces of storage media to accommodate installations requiring access to large numbers of storage media, such as optical discs, compact discs and tape cartridges.

A typical storage media library is generally shown in the references as reference numeral 10.

Arranged within the data storage library is at least one and preferably several media storage elements 40. The media storage elements 40 hold the storage media when the storage media are not being read or written to. The storage media can be any media which can be used to record information, such as data or graphics. The recording means may be magnetic, optical, or any other equivalent recording means known in the storage media art. Preferably, the storage media are compact discs (CDs) or tapes. In the application of the present invention, the storage media are housed in cartridges C. Each cartridge C has a pair of slots S at one end which are used by the robotics of the data storage library for moving the cartridge C from location to location within the data storage library.

Also arranged within the data storage library 10 is at least one and preferably several data transfer elements 50, which are used to read and write information on the storage media. Preferably, the data transfer elements 50 are compact disc drives (CD drives) or tape drives, but may also be any equivalent device such as an optical disc drive, a floppy disc drive, or a hard drive.

A media transfer element 70 is movable within the data storage library 10 to move the storage media among media storage elements 40 and data transfer elements 50.

Media, in cartridges C, are loaded into the data storage library by the operator by use of an import/export element 80. The cartridges C are inserted into the data storage library 10 through an access opening 12 in data storage library housing 14. The cartridges are inserted with the slots S facing the operator. Inserting a cartridge with the slots S away from the operator would be unnnatural and annoying for most operators.

However, once inside the data storage library 10, the cartridge C must be rotated 180 degrees so that the slots S are available for gripping by robotics such as the media transport element 70 which typically use "pickers" to grip the cartridge C by the slots S.

Complications may arise when trying to populate the data storage library 10 with a number of storage media.

First, the operator should not be able to gain access directly to the interior of the data storage library. The various moving mechanisms within the data storage library can cause severe injury to an operator's hand and fingers.

Furthermore, the data storage library must know at all times which particular media have been placed into it, and in which of the many media storage elements 40 the media reside. If operators are allowed access to the interior of the data storage library, it becomes impossible for the data storage library to know with assurance the location of each media.

For all of the above reasons, media must be introduced into and removed from the data storage library only through the import/export element 80, while the library is in operation.

In addition, once the media are loaded and rotated 180 degrees, they must be moved internally within the library for access by the media transport element 70.

There is a need for an improved import/export element which rotates the media 180 degrees between insertion and the robotics while at the same time translating the media within the data storage library, with a minimum of complexity and number of components.

SUMMARY OF THE INVENTION

In a data media storage library for storing and accessing storage media, the storage media being contained in cartridges, the data media storage library having a library housing, an access opening in the library housing for inserting cartridges, a storage array within the library housing including a number of storage locations, a plurality of media storage elements adapted to hold the storage media, a plurality of data transfer elements adapted to read and write information on the storage media, and a media transport element within the library housing adapted to move the storage media between the media storage element and the data transfer element, an import/export element comprising:

a) a cartridge holder adapted to receive the media cartridge from the access opening;

b) means for linearly translating said cartridge holder between a first point and a second point;

c) means for preventing rotation of said cartridge holder between said first point and an intermediate point located between said first point and said second point;

d) means for allowing rotation of said cartridge holder at said intermediate point;

e) means for rotating said cartridge holder 180 degrees at said intermediate point;

f) means for preventing rotation of said cartridge holder between said intermediate point and said second point; and     g) means for driving said linear translating means and said rotating means.

A principal object and advantage of the present invention is that it rotates the cartridge through 180 degrees at the same time that it translates the cartridge from one point (near the access opening) to a second point (near the media store).

Another principal object and advantage of the present invention is that it carries out the above function using a single driving motor.

Another principal object and advantage of the present invention is that involves fewer moving parts than earlier mechanisms.

Another principle object and advantage of the present invention is that all rotation occurs at a single point along the direction of transmission, thus allowing the designer to specify the point of rotation, avoiding conflicts with other portions of the data storage library.

DETAILED DESCRIPTION OF THE PREFERRED EMBODIMENTS

The import/export element of the present invention is generally shown in the Figures as reference numeral 110.

Figures 1, 3:
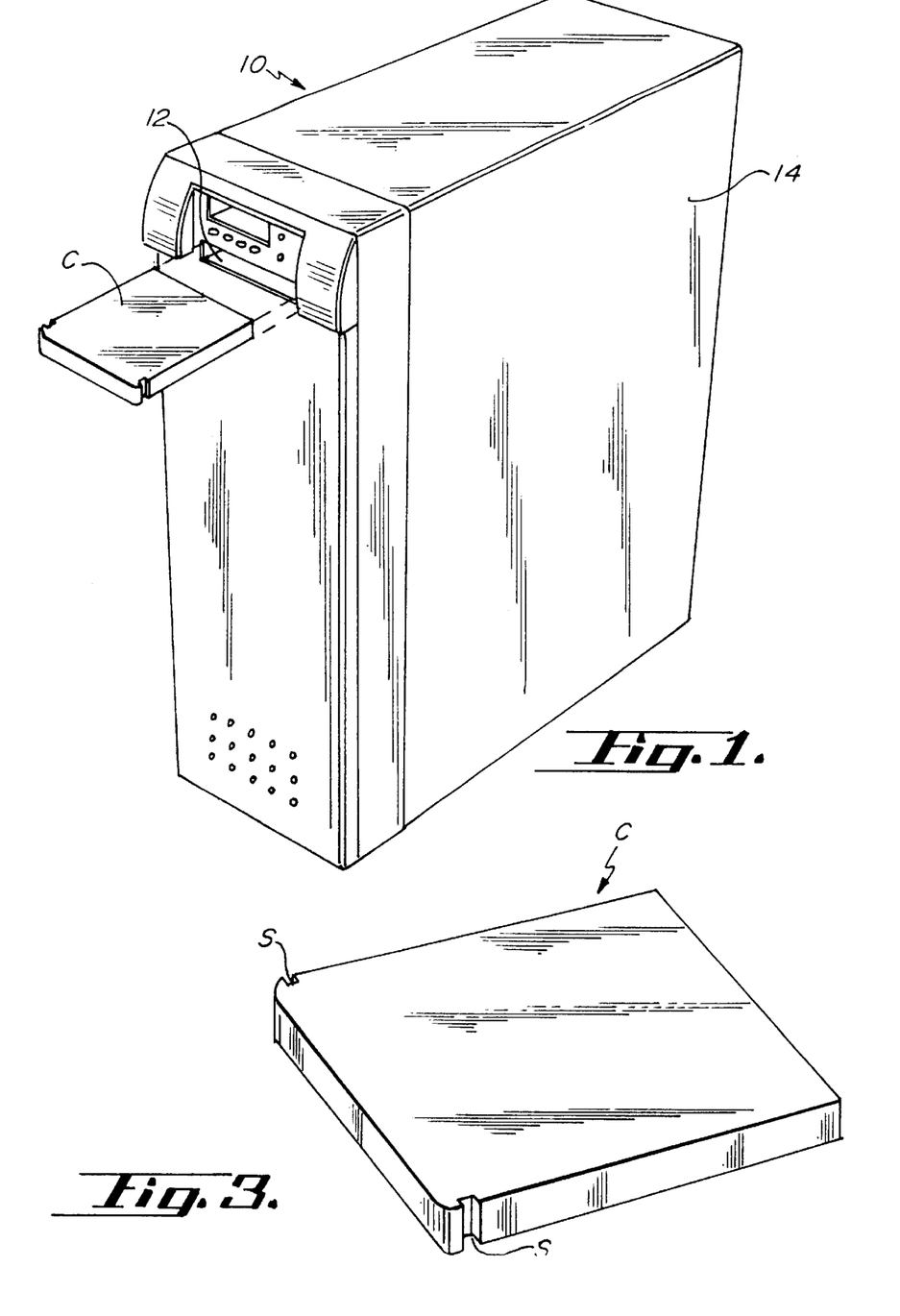
FIG. 1 is a perspective view of a data storage library in which the present invention is used, showing a cartridge C being inserted into the data storage library.
FIG. 3 is a perspective view of a media cartridge for use with the import/export element of the present invention.
Figure 2:
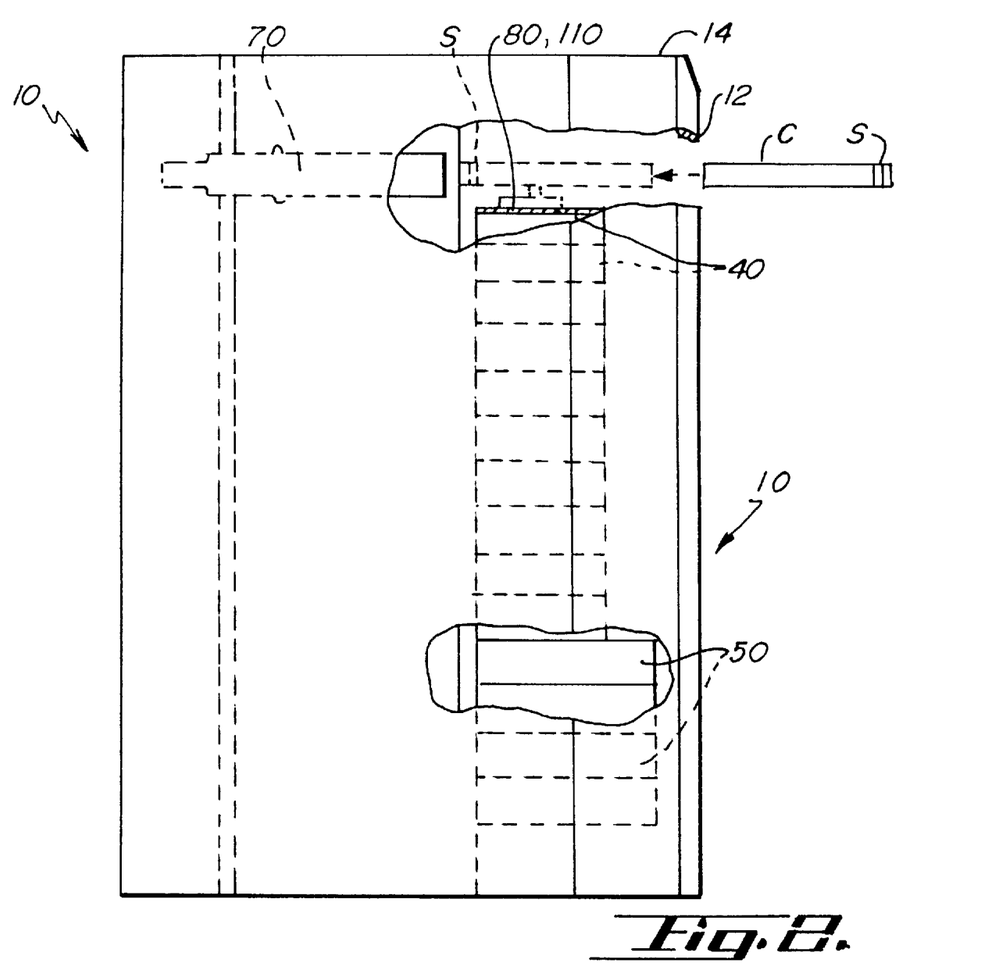
FIG. 2 is a schematic cross-section of the data storage library of FIG. 1, showing internal components in phantom, with some structure cut away to show the import/export element of the present invention.
Figures 3, 9:
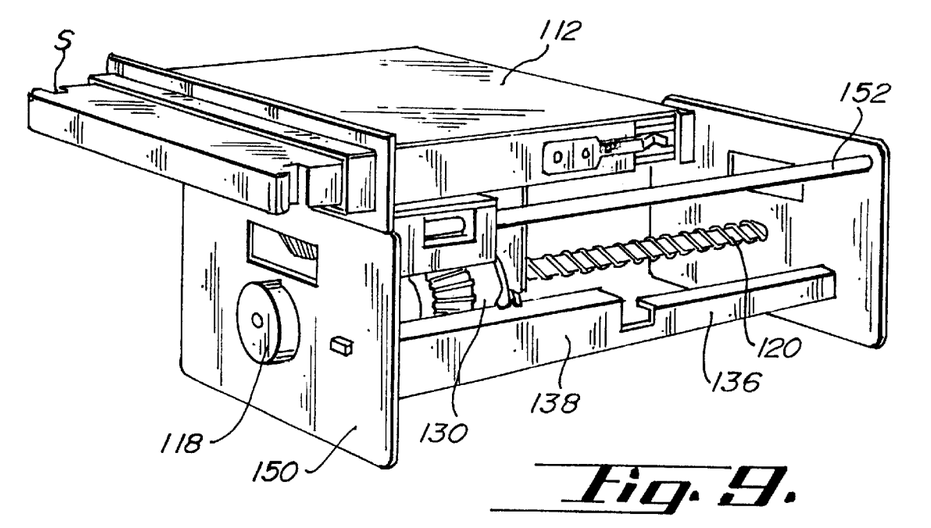
FIG. 9 is the same as FIG. 8, but showing the import/export element at the other end of its travel.
Figure 4:
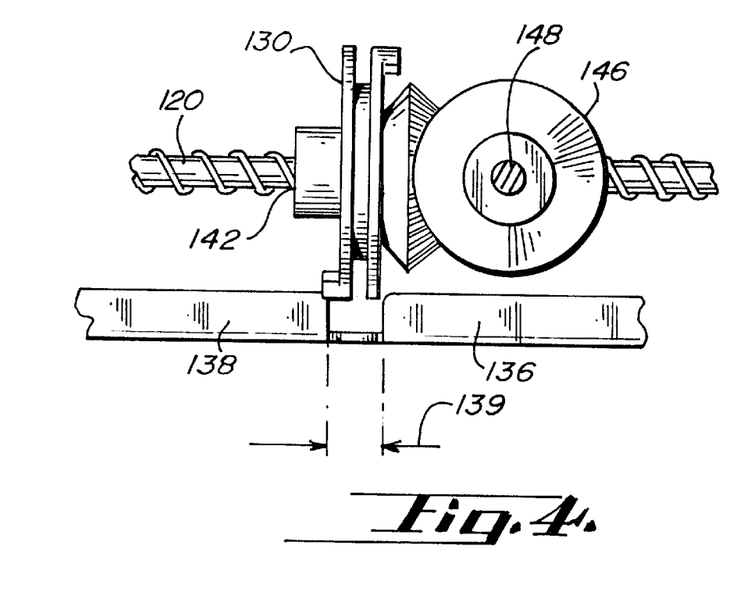
FIG. 4 is a partial plan view of the import/export element of the present invention.
Figure 5:
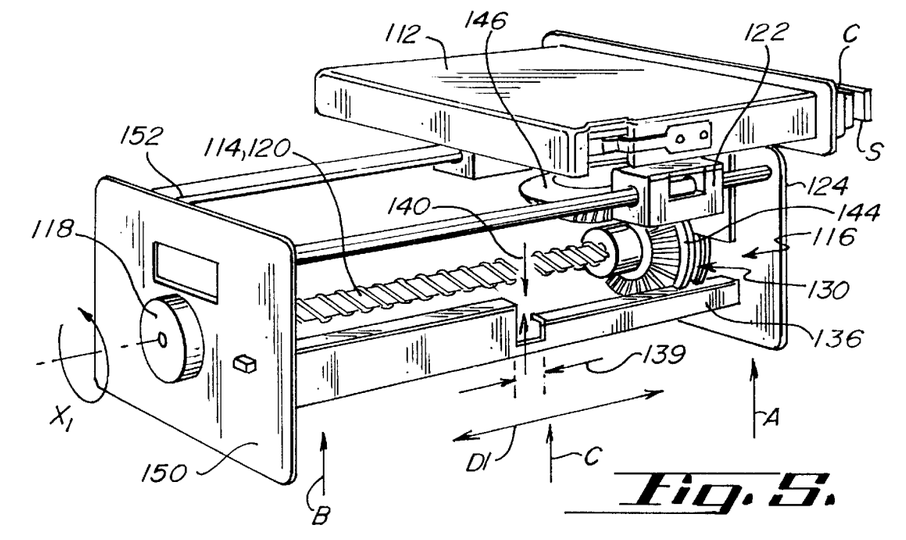
FIG. 5 is perspective view showing the import/export element positioned at one end of its travel.
Figure 6:
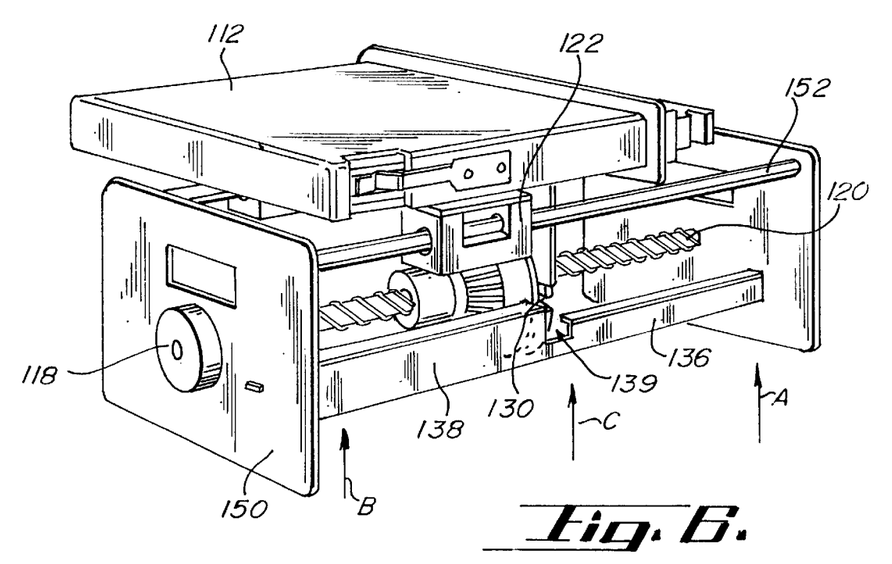
FIG. 6 is the same as FIG. 5, with the import/export element positioned at an intermediate point of its travel.
Figure 7:
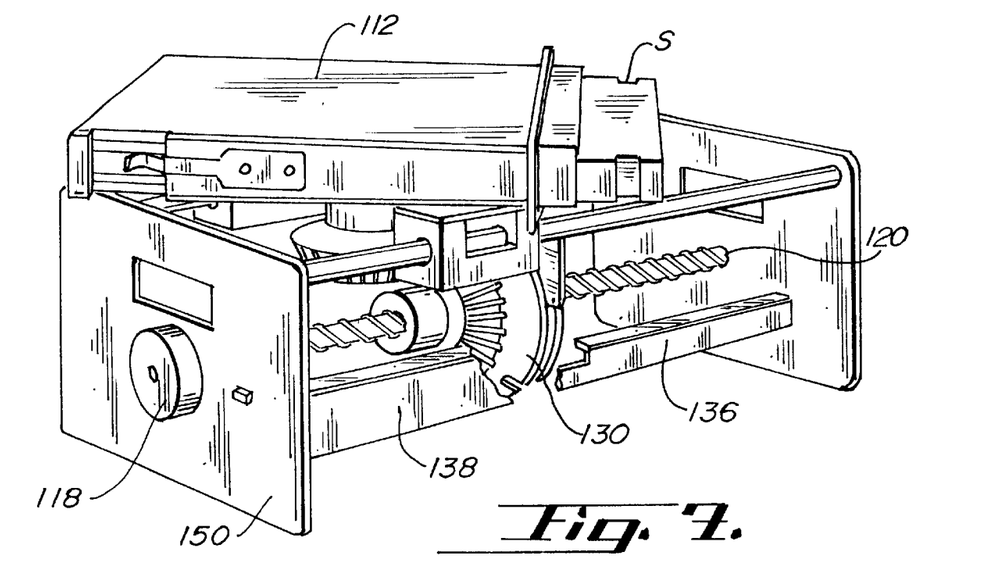
FIG. 7 is the same as FIG. 6, but showing rotation of the cartridge holder 45 degrees from the position in FIG. 6.

Referring first to FIG. 5, the import/export element 110 further comprises a cartridge holder 112 adapted to receive the media cartridge C from the access opening 12. The cartridge C is inserted into the cartridge holder 112 with the slots S protruding from the cartridge holder 112.

The import/export element 110 also comprises a means 114 for linearly translating the cartridge holder 112 between a first point A and a second point B.

The import/export element 110 also comprises a means for preventing rotation of said cartridge holder between said first point A and an intermediate point C located between said first point A and said second point B.

The import/export element 110 also comprises a means for allowing rotation of said cartridge holder at said intermediate point C.

The import/export element 110 further comprises a means 116 for rotating the cartridge holder 112 180 degrees at the intermediate point C.

The import/export element 110 also comprises a means for preventing rotation of said cartridge holder between said intermediate point C and said second point B.

The import/export element 110 also comprises a means 118 for driving linear translating means and the rotating means 116.

More particularly, but without intending to list exclusive embodiments, the means 114 for translating the cartridge holder 112 comprises a lead screw 120 mounted in a first direction D1 between the first point A and the second point B. The lead screw 120 rotates about a first axis X1 parallel to direction D1. The means 114 for translating also comprises a cartridge holder carrier 122 engaging the lead screw 120 and connected to the cartridge holder 112 for translation of the cartridge holder 112 along the first axis X1. The cartridge holder carrier 122 is preferably connected to a keyed nut 130 by a connector 124. The keyed nut 130 is described below.

More particularly, but without intending to list exclusive embodiments, the means for preventing rotation of said cartridge holder between said first point A and said intermediate point B further comprises a keyed nut 130 threadably engaging the lead screw 120. The keyed nut 130 has a first slot 132 and a second slot 134. The means for preventing rotation also comprises a first rail 136 alternately engaging the first slot 132 and second slot 134 and extending between the first point A and an intermediate point C.

More particularly, but without intending to list exclusive embodiments, the means for preventing rotation of said cartridge holder between said intermediate point C and said second point B further comprises said keyed nut 130 and a second rail 138 extending from the intermediate point C to the second point B. The second rail 138 alternately engages the first slot 132 and second slot 134 between the intermediate point C and the second point B.

Preferably, there is a horizontal gap 139 between the first rail 136 and the second rail 138. A vertical gap 140 separates the first rail 136 from the second rail 138 at intermediate point C. The first slot 132 and second slot 134 lie on a second axis X2 which is substantially normal to the first axis X1 and is offset from the center 142 of the keyed nut 130 by an offset amount O that is substantially the same as one-half of the vertical gap 140. The horizontal gap 139 is substantially the same as one-half of the pitch of the lead screw 120.

More particularly, but without intending to list exclusive embodiments, the means for rotating further preferably comprises a first bevel gear 144 fastened to the keyed nut 130, and a second bevel gear 146 meshing with the first bevel gear 144 and attached to a shaft 148, with the shaft 148 connected to the cartridge holder 112. As the lead screw 120 turns, the keyed nut 130 in turn rotates the first bevel gear 144, and the first bevel gear 144, meshing with the second bevel gear 146, causes the shaft 148 to turn the cartridge holder 112.

It will be seen from FIGS. 5 through 10 that, as the lead screw 120 rotates, the keyed nut 130, constrained against rotation because one of the slots 132, 134 engages the first rail 136, moves along the lead screw 120 from point A to point C. The cartridge holder carrier 122, attached to the keyed nut 130 by the connector 124, is moved along axis X1 from point A toward point C.

When the keyed nut 130 reaches point C, the slot 132, 134 that is engaging the first rail 136 moves off the rail 136 because of the horizontal gap 139. See FIG. 6. The keyed nut is therefore free to rotate, and as it rotates, it rotates the cartridge holder. See FIG. 7.

The keyed nut moves further along the lead screw until the other slot 132, 134 encounters the second rail 138, and the second rail 138 then engages the keyed nut 130 and prevents further rotation. See FIG. 8.

Figure 8:
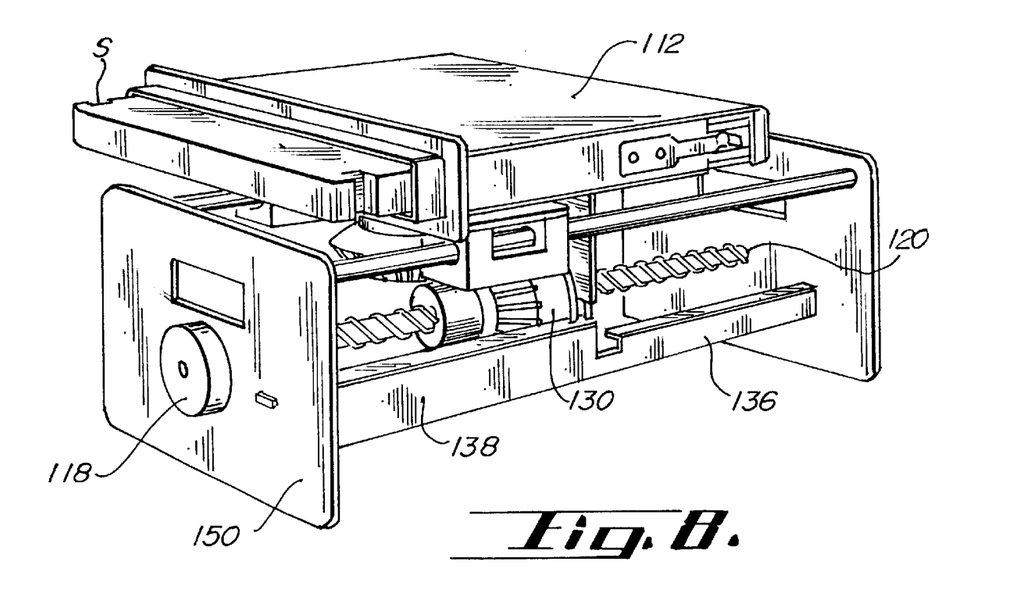
FIG. 8 is the same as FIG. 6, but showing rotation of the cartridge holder 180 degrees from the position in FIG. 6.
Figure 10:
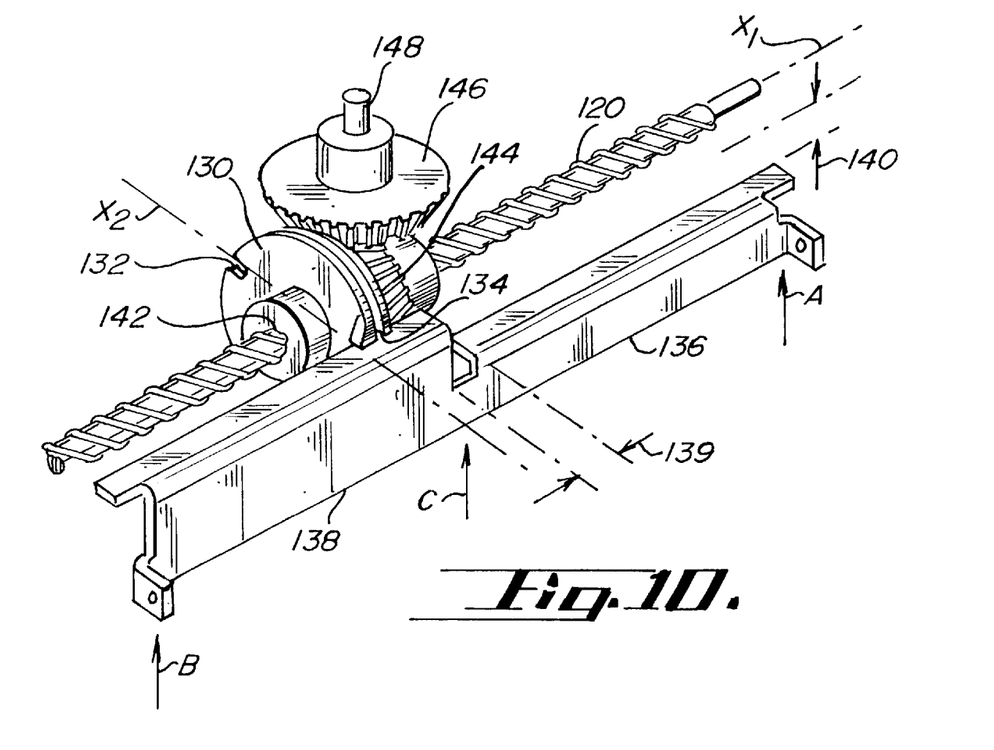
FIG. 10 is a detailed perspective view of the import/export element, showing internal structure.
Figure 11:
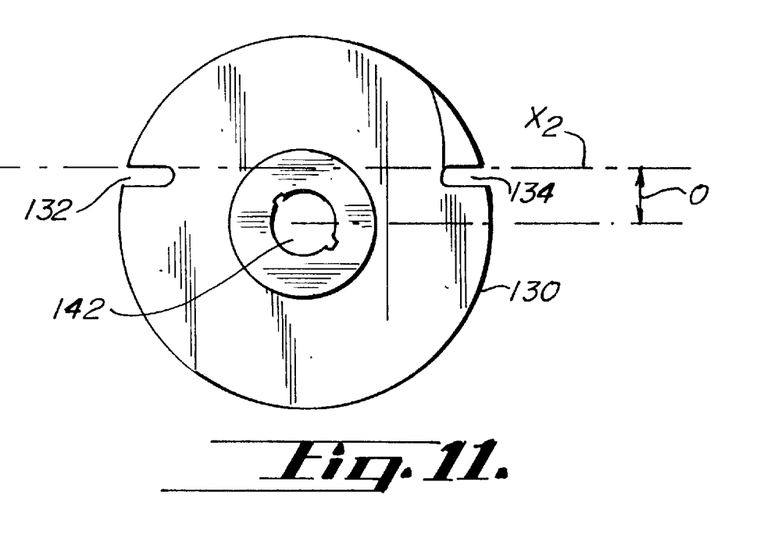
FIG. 11 is a detailed elevational view of the keyed nut of the present invention.

Because the slots 132, 134 lie along the second axis X2 which is offset about one-half of the vertical gap 140, the other slot will engage the second rail after the keyed nut 130 rotates about 180 degrees. In order for this to take place, the horizontal gap 139 should be about one-half the pitch of the lead screw 120.

The various elements of the import/export element 110, specifically the lead screw 120, keyed nut 130, rails 136, 138, first bevel gear 144, and second bevel gear 144 may be contained in an import/export element housing 150.

Preferably, the import/export element housing 150 further comprises at least one housing rail 152 extending in the first direction D1, and the cartridge holder carrier 122 slidingly engages the housing rail 152. This will ensure that there is no "play" in the mechanism as it moves along the lead screw 120.

The means 118 for driving the rotating means 116 may be any source of rotational motion, such as a belt or gear. Preferably, the means 118 for driving comprises an electric motor 160 geared to the lead screw 120 through gears 162.

Preferably, the keyed nut 130 and first bevel gear 140 are of integral, one-piece construction. For example, they may be molded into a single piece of plastic.

In operation, the operator loads the cartridge C into the cartridge holder 112 as the cartridge holder carrier 112 is at a point nearest the access opening 12 (which may be either point A or point B). As discussed, the operator loads the cartridge C so that the slots S protrude outside the cartridge holder 112. By any suitable means, for example, tripping of a sensor within the cartridge holder carrier 112, the driving means 118 is energized, causing rotation of the lead screw 120 and motion of the cartridge holder carrier 122 towards the media store (which is the other point, A or B). When the cartridge holder carrier reaches point C, the cartridge holder 112 is rotated 180 degrees so the slots S are facing toward the media store and media transport element 170. Media transport element 170 may then grip the cartridge by the slots S and move it elsewhere in the data storage library 10. To remove a cartridge from the library, the process is reversed.

The present invention maybe embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed:

1. In a data media storage library for storing and accessing storage media, the storage media being contained in cartridges, the data media storage library having a library housing, an access opening in the library housing for inserting cartridges, a storage array within the library housing including a number of storage locations, a plurality of media storage elements adapted to hold the storage media, a plurality of data transfer elements adapted to read and write information on the storage media, and a media transport element within the library housing adapted to move the storage media between the media storage element and the data transfer element, an import/export element comprising:

(a) a cartridge holder adapted to receive the media cartridge from the access opening;
    (b) means for linearly translating said cartridge holder between a first point and a second point;
    (c) means for preventing rotation of said cartridge holder between said first point and an intermediate point located between said first point and said second point;
    (d) means for allowing rotation of said cartridge holder at said intermediate point;
    (e) means for rotating said cartridge holder 180 degrees at said intermediate point;
    (f) means for preventing rotation of said cartridge holder between said intermediate point and said second point; and
    (g) means for driving said linear translating means and said rotating means.

2. The import/export element of claim 1, wherein said means for linearly translating the cartridge holder further comprises a lead screw mounted in a first direction between said first point and said second point and rotating about a first axis parallel to said first direction and a cartridge holder carrier engaging said lead screw and connected to said cartridge holder for translation of said cartridge holder along said first axis.

3. The import/export element of claim 2, wherein said means for preventing rotation of said cartridge holder between said first point and said intermediate point further comprises a keyed nut threadably engaging said lead screw, said keyed nut having a first slot and a second slot, and a first rail extending between said first point and said intermediate point, one of said first slot and said second slot engaging said first rail between said first point and said intermediate point.

4. The import/export element of claim 3, wherein said means for allowing rotation of said cartridge holder at said intermediate point further comprises a horizontal gap between said first rail and said second rail at said intermediate point.

5. The import/export element of claim 4, wherein said means for rotating said cartridge holder 180 degrees at said intermediate point further comprises:

(a) a first bevel gear fastened to said keyed nut; and
    (b) a second bevel gear meshing with said first bevel gear and a shaft driven by said second bevel gear and connected to said cartridge holder.

6. The import/export element of claim 5, wherein said means for preventing rotation of said cartridge holder between said intermediate point and said second point further comprises said keyed nut and a second rail extending between said intermediate point and said second point, one of said first slot and said second slot engaging said second rail between said intermediate point and said second point.

7. The import/export element of claim 6, further comprising a vertical gap between said first rail and said second rail at said intermediate point; wherein said first slot and said second slot lie on a second axis, said second axis being substantially normal to said first axis and offset from the center of said keyed nut by an offset amount substantially the same as one-half of said vertical gap.

8. The import/export element of claim 4, wherein said horizontal gap is substantially the same as one-half of the pitch of said lead screw.

9. The import/export element of claim 5, further comprising an import/export element housing containing said lead screw, said keyed nut, said first rail, said second rail, said first bevel gear, and said second bevel gear.

10. The import/export element of claim 1, wherein said means for driving said linear translating means and said rotating means comprises an electric motor.

11. The import/export element of claim 5, wherein said keyed nut and said first bevel gear are of integral one-piece construction.

12. In a data media storage library for storing and accessing storage media, the storage media being contained in cartridges, the data media storage library having a library housing, an access opening in the library housing for inserting cartridges, a storage array within the library housing including a storage locations, a plurality of media storage elements adapted to hold the storage media, a plurality of data transfer elements adapted to read and write information on the storage media, and a media transport element within the library housing adapted to move the storage media between the media storage element and the data transfer element, an import/export element comprising:

(a) a cartridge holder adapted to receive the media cartridge from the access opening;
    (b) a lead screw mounted in a first direction between a first point and a second point and rotating about a first axis parallel to said first direction and a cartridge holder carrier engaging said lead screw and connected to said cartridge holder for translation of said cartridge holder along said first axis;
    (c) means for preventing rotation of said cartridge holder between said first point and an intermediate point located between said first point and said second point;

(d) means for allowing rotation of said cartridge holder at said intermediate point;

(e) means for rotating said cartridge holder 180 degrees at said intermediate point;

(f) means for preventing rotation of said cartridge holder between said intermediate point and said second point; and (g) means for driving said rotating means.

13. The import/export element of claim 12, wherein said means for preventing rotation of said cartridge holder between said first point and said intermediate point further comprises a keyed nut threadably engaging said lead screw, said keyed nut having a first slot and a second slot, and a first rail extending between said first point and said intermediate point, one of said first slot and said second slot engaging said first rail between said first point and said intermediate point.

14. The import/export element of claim 13, wherein said means for allowing rotation of said cartridge holder at said intermediate point further comprises a horizontal gap between said first rail and said second rail at said intermediate point.

15. The import/export element of claim 14, wherein said means for rotating said cartridge holder 180 degrees at said intermediate point further comprises:

(a) a first bevel gear fastened to said keyed nut; and (b) a second bevel gear meshing with said first bevel gear and a shaft driven by said second bevel gear and connected to said cartridge holder.

16. The import/export element of claim 15, wherein said means for preventing rotation of said cartridge holder between said intermediate point and said second point further comprises a second rail extending between said intermediate point and said second point, one of said first slot and said second slot engaging said second rail between said intermediate point and said second point.

17. The import/export element of claim 16, further comprising a vertical gap between said first rail and said second rail at said intermediate point; wherein said first slot and said second slot lie on a second axis, said second axis being substantially normal to said first axis and offset from the center of said keyed nut by an offset amount substantially the same as one-half of said vertical gap.

18. The import/export element of claim 14, wherein said horizontal gap is substantially the same as one-half of the pitch of said lead screw.

19. The import/export element of claim 15, further comprising an import/export element housing containing said lead screw, said keyed nut, said first rail, said second rail, said first bevel gear, and said second bevel gear.

20. The import/export element of claim 12, wherein said means for driving said rotating means comprises an electric motor.

21. The import/export element of claim 15, wherein said keyed nut and said first bevel gear are of integral one-piece construction.

22. In a data media storage library for storing and accessing storage media, the storage media being contained in cartridges, the data media storage library having a library housing, an access opening in the library housing for inserting cartridges, a storage array within the library housing including a number of storage locations, a plurality of media storage elements adapted to hold the storage media, a plurality of data transfer elements adapted to read and write information on the storage media, and a media transport element within the library housing adapted to move the storage media between the media storage element and the data transfer element, an import/export comprising:

(a) a cartridge holder adapted to receive the media cartridge from the access opening:

(b) a lead screw mounted in a first direction a first point and a second point and rotating about a first axis parallel to said first direction and a cartridge holder carrier engaging said lead screw and connected to said cartridge holder for translation of said cartridge holder along said first axis;

(c) a keyed nut threadably engaging said lead screw, said keyed nut having a first slot and a second slot, an intermediate point between said first point and said second point, a first rail extending between said first point and said intermediate point, and a second rail extending between said intermediate point and said second point;

(d) one of said first slot and said second slot engaging said first rail between said first point and said intermediate point and engaging said second rail between said intermediate point and said second point;

(e) a horizontal gap between said first rail and said second rail at said intermediate point;

(f) a first bevel gear fastened to said keyed nut;

(g) a second bevel gear meshing with said first bevel gear and a shaft driven by said second bevel gear and connected to said cartridge holder;

(h) wherein rotation of said lead screw moves said keyed nut along said first axis, and wherein said first rail prevents the rotation of said keyed nut between said first point and said intermediate point, wherein said horizontal gap allows rotation of said keyed nut, and wherein said second rail prevents rotation of said keyed nut between said intermediate point and said second point; and (i) means for driving said rotating means.

23. The import/export element of claim 22, further comprising a vertical gap between said first rail and said second rail at said intermediate point; wherein said first slot and said second slot lie on a second axis, said second axis being substantially normal to said first axis and offset from the center of said keyed nut by an offset amount substantially the same as one-half of said vertical gap.

24. The import/export element of claim 22, wherein said horizontal gap is substantially the same as one-half of the pitch of said lead screw.

25. The import/export element of claim 22, further comprising an import/export element housing containing said lead screw, said keyed nut, said rail, said detent member, said first bevel gear, and said second bevel gear.

26. The import/export element of claim 22, wherein said means for driving said rotating means comprises an electric motor.

27. The import/export element of claim 22, wherein said keyed nut and said first bevel gear are of integral one-piece construction.

* * * * *